United States Patent
Saridaki et al.

(10) Patent No.: US 10,135,806 B2
(45) Date of Patent: Nov. 20, 2018

(54) METHOD AND SYSTEM FOR CREATING A VIRTUAL SIP USER AGENT BY USE OF A WEBRTC ENABLED WEB BROWSER

(71) Applicant: Unify GmbH & Co. KG, Munich (DE)

(72) Inventors: Eleni Saridaki, Egaleo (GR); Elias Balafoutis, Zografou (GR)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 15/715,796

(22) Filed: Sep. 26, 2017

(65) Prior Publication Data
US 2018/0026966 A1    Jan. 25, 2018

Related U.S. Application Data

(63) Continuation of application No. 14/422,089, filed as application No. PCT/EP2012/004403 on Oct. 19, 2012.

(51) Int. Cl.
*H04L 29/06* (2006.01)
*H04L 29/08* (2006.01)
*H04L 29/12* (2006.01)

(52) U.S. Cl.
CPC ........ *H04L 63/0815* (2013.01); *H04L 61/309* (2013.01); *H04L 65/1006* (2013.01); *H04L 65/1053* (2013.01); *H04L 65/1069* (2013.01); *H04L 65/608* (2013.01); *H04L 67/02* (2013.01); *H04L 67/141* (2013.01)

(58) Field of Classification Search
CPC .... H04L 63/08; H04L 63/083–63/0846; H04L 63/0884
See application file for complete search history.

(56) References Cited

U.S. PATENT DOCUMENTS

| | | | |
|---|---|---|---|
| 8,695,077 B1 * | 4/2014 | Gerhard | H04L 63/0815 726/8 |
| 2003/0135569 A1 | 7/2003 | Khakoo et al. | |
| 2005/0277431 A1 | 12/2005 | White | |
| 2005/0286504 A1 * | 12/2005 | Kwon | H04L 29/06027 370/356 |
| 2006/0142011 A1 | 6/2006 | Kalllo | |
| 2006/0223563 A1 | 10/2006 | Sung et al. | |
| 2006/0282408 A1 | 12/2006 | Wisely et al. | |
| 2007/0168521 A1 * | 7/2007 | Kaji | H04L 29/06027 709/227 |

(Continued)

OTHER PUBLICATIONS

PKE Consulting LLC, "Introduction to WebRTC", Apr. 1, 2012, p. 1.*

(Continued)

*Primary Examiner* — Catherine Thiaw
*Assistant Examiner* — Arya Golriz
(74) *Attorney, Agent, or Firm* — Buchanan Ingersoll & Rooney PC (57) ABSTRACT

A method for creating a virtual SIP user agent by use of a webRTC enabled web browser (200) comprises a user logging in to a web application server (400) via a webRTC enabled web browser (200). The web application server (400) uses the logged on user identity to lookup an associated SIP user identity along with a registrar server address and the web application server (400) initiates a SIP registration procedure using its IP address as the registered contact.

20 Claims, 4 Drawing Sheets

(56) References Cited

U.S. PATENT DOCUMENTS

| | | | |
|---|---|---|---|
| 2008/0127320 A1 | 5/2008 | De Lutiis et al. | |
| 2009/0089435 A1 | 4/2009 | Terrill et al. | |
| 2009/0285200 A1 | 11/2009 | Dekeyser et al. | |
| 2009/0300197 A1 | 12/2009 | Tanizawa et al. | |
| 2010/0111049 A1 | 5/2010 | Siegel et al. | |
| 2011/0072144 A1 | 3/2011 | Fikouras et al. | |
| 2012/0226815 A1 | 9/2012 | Goodman et al. | |
| 2014/0108594 A1* | 4/2014 | Siegel ................ | H04L 67/306 709/217 |

OTHER PUBLICATIONS

International Search Report and Written Opinion for PCT/EP2012/004403 dated Jul. 1, 2013 (Form PCT/ISA/210) and (Form PCT/ISA/237).

Kaplan, H., Acme Packet, Requirements for Interworking WebRTC with Current SIP Deployments; Network Working Group, Internet Draft, expires on Oct. 31, 2011, 22 pages.

Ohlsson O., "Support of SDES in WebRTC" Network Working Group, Internet Draft, expires on Feb. 21, 2013, 11 pages.

I. Castillo, et al., "Open In-The-Wire Protocol for RTC-Web draft-sipdoc-rtcweb-open-wire-protocol-00" Network Vorking Group, Internet Draft, expires on Apr. 27, 2012, 22 pages.

Rosenberg, Jdrosen Net J., Interactive Connectivity Establishment (ICE): A Protocol for Network Address Translator (NAT) Traversal for Offer/Answer Protocols; Apr. 2010, 118 pages.

http://en.wikipedia.org/w/index.php?title=Web_browser&oldid=506896196.

http://en.wikipedia.org/w/index.php?title=WebRTC&oldid=507269848.

http://en.wikipedia.org/w/index.php?title=Single_sign-on&oldid=504435254.

http://en.wikipedia.org/w/index.php?title=Session_initiation_Protocol&oldid=503197983.

http://en.wikipedia.org/w/index.php?title=ldentity_management_system&oldid=501893542.

Rosenberg, jdrosen.net, Interactive Connectivity Establishment (ICE): A Protocol for Network Address Translator (NAT) Traversal for Offer/Answer Protocols; Apr. 2010, 117 pages.

* cited by examiner

METHOD AND SYSTEM FOR CREATING A VIRTUAL SIP USER AGENT BY USE OF A WEBRTC ENABLED WEB BROWSER

CROSS-REFERENCE TO RELATED APPLICATIONS

This application is a continuation application of U.S. patent application Ser. No. 14/422,089, which is the United States national stage under 35 U.S.C. § 371 of PCT International Application No. PCT/EP2012/004403, filed on Oct. 19, 2012.

BACKGROUND OF THE INVENTION

Field of the Invention

Embodiments relate to methods and systems for creating a virtual SIP user agent by use of a webRTC enabled web browser.

Background of the Related Art

Voice and video communication over the web emerges as a new real time communication technology in both a consumer as well as enterprise communication environment (open source projects such as Web Real Time Communication ("WebRTC")). Reuse of user resources such as a telephone number across legacy/VoIP communication devices as well as web based terminals is essential for the seamless integration of web based real time communication into an existing legacy telephony or VoIP environment.

BRIEF SUMMARY OF THE INVENTION

According to the present invention a method is provided for creating a virtual SIP user agent by use of a webRTC enabled web browser 200. The method comprises a user logging in to a web application server 400 via a webRTC enabled web browser 200. The method further comprises that the web application server 400 uses the logged on user identity to lookup an associated SIP user identity along with a registrar server address; and that the web application server 400 initiates a SIP registration procedure using its IP address as the registered contact.

In connection with the present description of the invention or preferred embodiments of the invention, the term web browser (or webbrowser or browser) shall refer to any kind of software, by which a user may communicate with a web application server. More specifically this term comprises any kind of software application for retrieving, presenting, and traversing information resources on the World Wide Web. An information resource is identified by a Uniform Resource Identifier (URI) and may be a web page, image, video, or other piece of content. Hyperlinks present in resources enable users easily to navigate their browsers to related resources. A web browser can also be defined as an application software or program designed to enable users to access, retrieve and view documents and other resources on the Internet. Although browsers are primarily intended to use the World Wide Web, they can also be used to access information provided by web servers in private networks or files in file systems. Important examples of web browsers are Firefox, Google Chrome, Internet Explorer, Opera, and Safari.

WebRTC (Web Real-Time Communication) is an API definition being drafted by the World Wide Web Consortium (W3C), with a mailing list created in April 2011 and jointly in the IETF with a working group chartered in May 2011. It is also the name of framework that was open sourced on Jun. 1, 2011, which implements early versions of the standard and allows web browsers to conduct real-time communication. The goal of WebRTC is to enable applications such as voice calling, video chat and P2P file sharing without plugins.

According to a preferred embodiment of the invention, the method is characterized by a login using a username and password authentication. To log in to an account, a user is typically required to authenticate oneself with a password or other credentials for the purposes of accounting, security, logging, and resource management.

According to a preferred embodiment of the invention, the method is characterized by an authentication with a single sign-on, e.g. with a corporate entitlement system. Single sign-on (SSO) is a property of access control of multiple related, but independent software systems. With this property a user logs in once and gains access to all systems without being prompted to log in again at each of them. Conversely, Single sign-off is the property whereby a single action of signing out terminates access to multiple software systems. As different applications and resources support different authentication mechanisms, single sign-on has to internally translate to and store different credentials compared to what is used for initial authentication.

According to a preferred embodiment of the invention, the method is characterized in that the associated SIP user identity or the registrar server addresses are at least partly supplied by the user. A SIP user agent (UA) is a logical network end-point used to create or receive SIP messages and thereby manage a SIP session. A SIP UA can perform the role of a User Agent Client (UAC), which sends SIP requests, and the User Agent Server (UAS), which receives the requests and returns a SIP response. These roles of UAC and UAS only last for the duration of a SIP transaction. A SIP phone is a SIP user agent that provides the traditional call functions of a telephone, such as dial, answer, reject, hold/unhold, and call transfer. SIP phones may be implemented as a hardware device or as a soft phone. As vendors increasingly implement SIP as a standard telephony platform, often driven by 4G efforts, the distinction between hardware-based and software-based SIP phones is being blurred and SIP elements are implemented in the basic firmware functions of many IP-capable devices.

A server that accepts REGISTER requests and places the information it receives in those requests into the location service for the domain it handles which registers one or more IP addresses to a certain SIP URI, indicated by the sip: scheme, although other protocol schemes are possible (such as tel:). More than one user agent can register at the same URI, with the result that all registered user agents will receive a call to the SIP URI. SIP registrars are logical elements, and are commonly co-located with SIP proxies.

SIP is a text-based protocol with syntax similar to that of HTTP. There are two different types of SIP messages: requests and responses. The first line of a request has a method, defining the nature of the request, and a Request-URI, indicating where the request should be sent. The first line of a response has a response code. For SIP requests, RFC 3261 defines the following methods:
REGISTER: Used by a UA to indicate its current IP address and the URLs for which it would like to receive calls.
INVITE: Used to establish a media session between user agents.
ACK: Confirms reliable message exchanges.
CANCEL: Terminates a pending request.
BYE: Terminates a session between two users in a conference.

OPTIONS: Requests information about the capabilities of a caller, without setting up a call.

According to a preferred embodiment of the invention, the method is characterized in that the associated SIP user identity or the registrar server addresses are at least partly retrieved by a user identity management system. An identity management system refers to an information system, or to a set of technologies that can be used for enterprise or cross-network Identity management. Identity management (IdM) describes the management of individual identities, their authentication, authorization, roles, and privileges within or across system and enterprise boundaries with the goal of increasing security and productivity while decreasing cost, downtime, and repetitive tasks. The terms "Identity Management" and "Access and Identity Management" (or AIM) are terms that are frequently used interchangeably under the title of Identity management while Identity management itself falls the umbrella of IT Security. Identity management systems, products, applications, and platforms are commercial Identity management solutions implemented for enterprises and organizations.

According to a preferred embodiment of the invention, the method is characterized in that the web application services 400 assume and maintains in the database 500 user SIP credentials 001 (e.g. SIP registrar address, E.164 number or SIP username, digest authentication password) and propagate this information to the user SIP SBC/Proxy/Registrar 700 via an appropriate SIP request interface, e.g. a REGISTER message 003.

The present invention may also be implemented by a system for using a method according to the present invention or one of its embodiments, the system comprising a web client running on a webRTC enabled web browser 200, a web application server 400, a SIP registrar server and a SIP server 700.

DETAILED DESCRIPTION OF THE INVENTION

According to a preferred embodiment of the present invention, a user logs in to the web application server 400 via the web client interface 200. In some embodiments this may be a username and password authentication. In other embodiments authentication may be done with single sign-on with a corporate entitlement system. The web application server preferably uses the logged on user identity to lookup an associated SIP user identity along with a registrar server address. In this embodiment this information can be partly supplied by the user (self management). In other embodiments of the present invention this information is retrieved by a user identity management system.

Once the SIP user identity for the logged on user is found the web application server 400 will preferably initiate a SIP registration procedure using its IP address as the registered contact. SIP users authentication and authorization methods e.g. via REGISTER and SUBSCRIBE requests, can be used implicitly for web based communication enablement especially if the user already owns a SIP address/E.164 number.

So the identity of the web media client user and validation of user accessibility options is preferably covered indirectly in the SIP domain, simply if the web application services 400 assume and maintains in the database 500 user SIP credentials 001 (e.g. SIP registrar address, E.164 number or SIP username, digest authentication password) and propagate this information to the user SIP SBC/Proxy/Registrar 700 via the appropriate SIP request interface (REGISTER message) 003 at user web login on a secure session. Addressing the user is feasible through E.164 numbering convention or SIP URI, or other valid URL identifiers like email etc, as each individual usually is the owner of various system accounts and identifiers.

Figure 3:
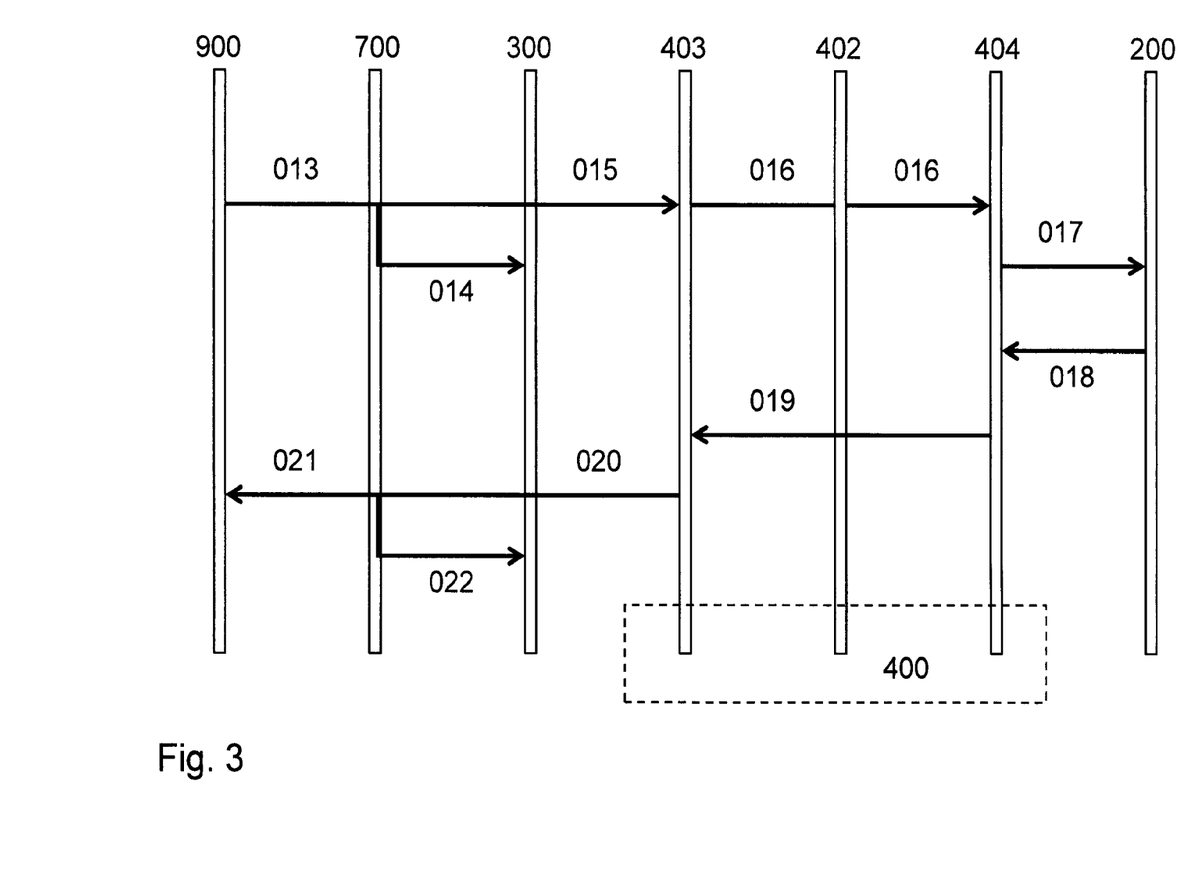
FIG. 3 illustrates the SIP initiated connection to a WebRTC/SIP destination according to a preferred embodiment of the invention.

This way the web server will preferably be registered as another contact for the authenticated user, as long as the web server belongs to a trusted domain to the SIP domain. Therefore a new call received against this SIP user identity can also reach and be handled at the user's web application enriched with WebRTC capabilities, in parallel to other existing authorized contacts that are registered against this SIP user identity such as IP phone device or IP soft client or GWs (SIP Forking feature) (FIG. 3). The user preferably has the choice to select his preferred medium for audio or video communication: browser 200 or SIP endpoint (300) or even a smart phone/tablet 100, as incoming traffic will preferably reach both SIP 300 and WebRTC 100, 200 enabled clients, due to this parallel registration and subscription on SIP services.

Once the web application server 400 receives the incoming call it preferably extracts the media description and offers the call to the user at the web browser 200 just as if this call is a normal webRTC offer as defined in the respective W3C draft. From this point on, the role of the web application server is preferably that of a SIP user agent in the sense that it is responsible for the handling of the communication session. Negotiation on the media description as well as connectivity (ICE) remains a responsibility of the web browser. Once the negotiation succeeds an RTP communication between the web browser and the initiating device is preferably started.

Figure 4:
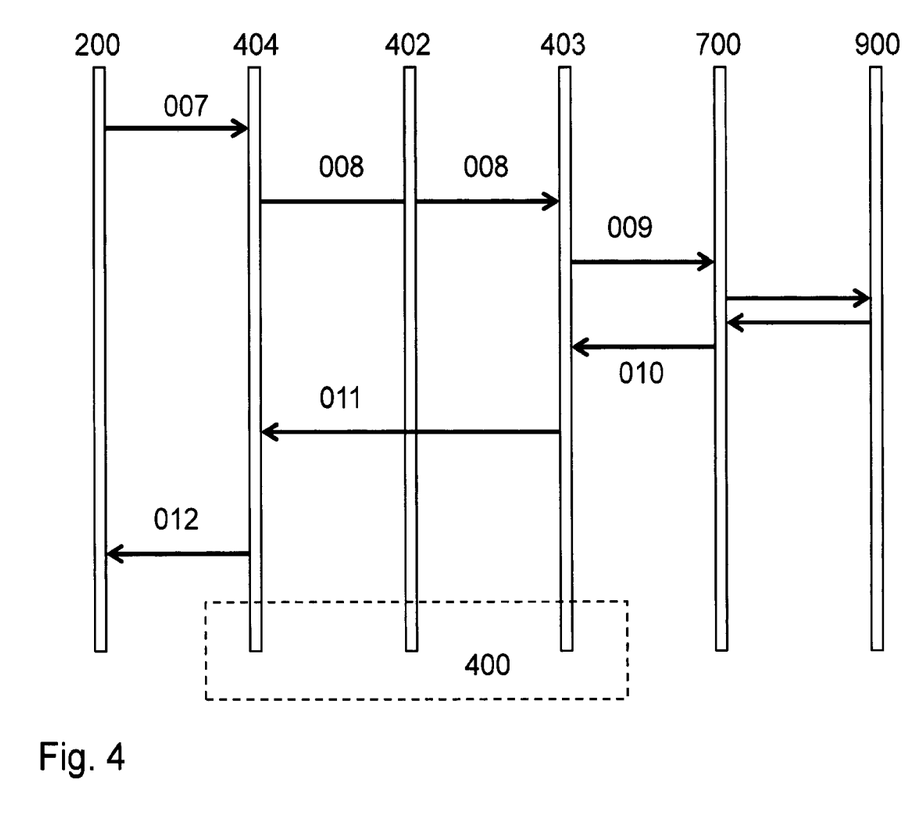
FIG. 4 illustrates the WebRTC initiated connection to a SIP destination according to a preferred embodiment of the invention.

Vice versa a WebRTC session could reach this way another VoIP 900 or PSTN telephony user 1000 and have the originator user's SIP identifiers (names and numbers) presented to the other side as shown in FIG. 4. Device selection may be still a user's choice, but in addition can be system defined based on user's selected destination: WebRTC destination 600 will preferably be receiving WebRTC based calls, while SIP destinations 900 will preferably be reached though SIP session establishment initiated by the web application.

In this case, the web application server media management services 400 work similar to a Session Board Controller or Gateway supporting the transition from the WebRTC domain to the SIP domain. The user may seamlessly perform SIP or webRTC calls without experiencing any difference in the user interface.

The disclosure of the present invention focuses on the aspect of integration methods of a pure web browser media communication based on WebRTC standardization and existing session based communication interfaces like SIP.

Two main aspects exist covering for the smooth interoperability with existing networks in a trusted network environment and seamless user experience:
1) Supporting in a WebRTC enabled communication application 400 users that already own one or more existing SIP accounts (E.164 numbers potentially as well) and
2) Establishing a real time audio and video communication between web applications and other VoIP or even legacy PSTN systems through stream trans-coding mechanics.

Figure 1:
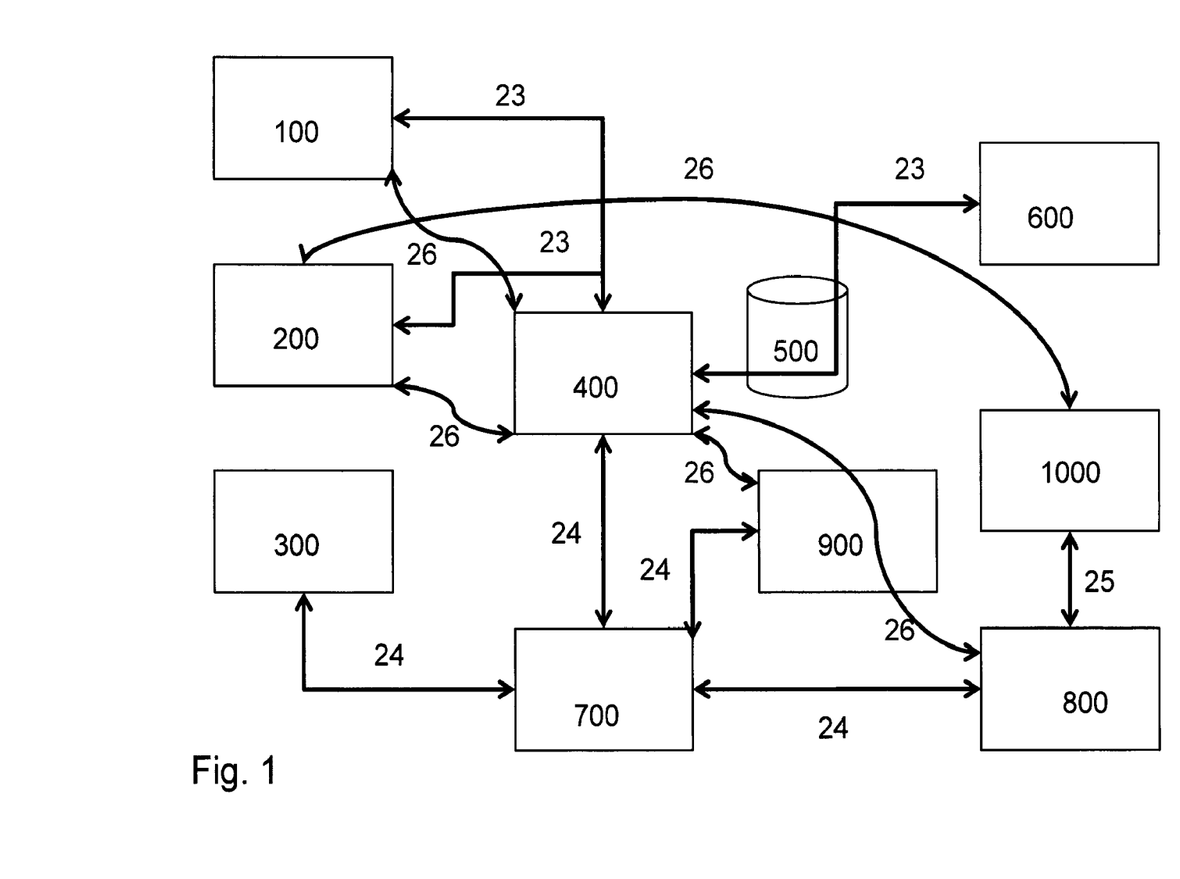
FIG. 1 illustrates a preferred system configuration and/or network architecture of a system according to the present invention.
Figure 2:
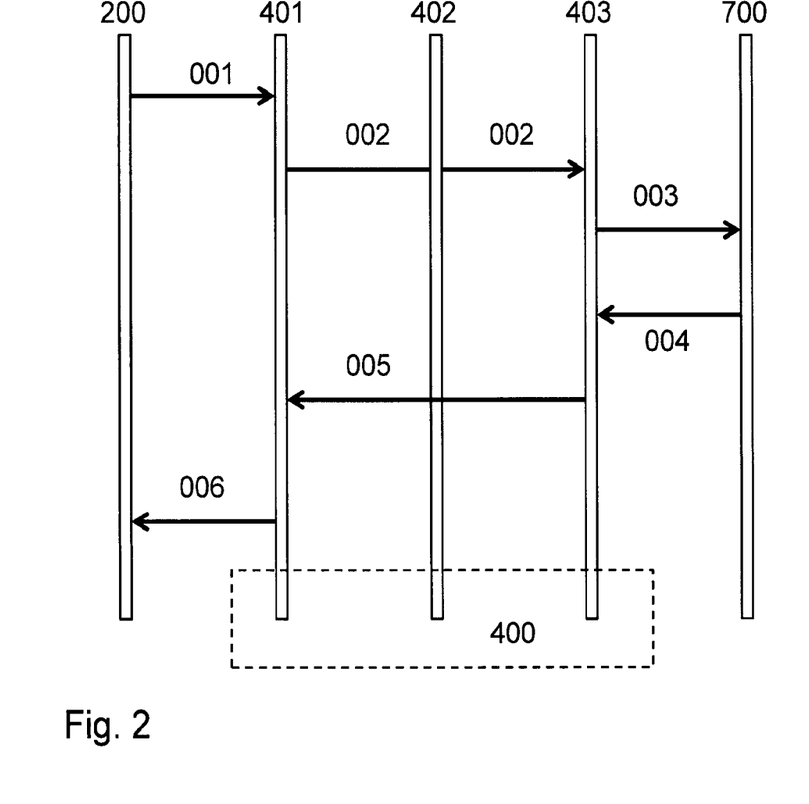
FIG. 2 illustrates the WebRTC authentication via SIP message sequence according to a preferred embodiment of the invention.

An example architecture shown in FIG. 1 comprises basically of a web client running on a webRTC enabled web browser 200, a web application server 400, a SIP registrar server and a SIP server 700. In some embodiments a single server may have the role of both the SIP server and the SIP registrar server. Also in some embodiments the web application server may include media reception and transmission facilities.

Voice and video communication over the web emerges as a new real time communication technology in both a consumer as well as enterprise communication environment (open source projects such as Web Real Time Communication ("WebRTC")). The reuse of user resources such as a telephone number across legacy/VoIP communication devices as well as web based terminals is essential for the seamless integration of web based real time communication into an existing legacy telephony or VoIP environment.

The present invention discloses methods and procedures that allow the reuse of a user identity such as a telephone number or a user URL in both web based real time communication and legacy/VoIP Communication systems.

In particular the user of a web application that offers web based real time communication services is offered the option to answer an incoming call against a given telephone number via a web based client interface while this call is also offered to other VoIP or legacy devices of this user. In addition, a call that is initiated via a web browser towards other users (either web or VoIP or legacy) shows a dialable user identity that can be called back. On this topic, potential media codec incompatibilities between web media-enabled clients and existing VoIP or legacy telephony clients are also an important aspect to cover.

In addition due to the nature of web real time transmission, peer to peer connectivity, video teleconference connections or general multi-party connections can be established up to a certain number of participants. The mesh topology and personal pc media processing performance limitations for media stream handling. Lastly there is no defined connection between the international public telecommunication numbering plan E.164 and WebRTC (address reference is purely URL defined).

This goal is preferably achieved without a need for special network configuration such routing rules in any of the existing communication infrastructure.

The use of web based real time communication with voice and video has been very limited in the prior art for numerous reasons including the lack of native support by the web browsers and the diversity of implementation of web browser plug-ins. Standardization activities along with prototype implementation of the early standardization steps are ongoing but the interworking between web application servers that offer web based real time communication services and other telecommunication equipment such as VOID switch and GW have been left outside the standardization activities up to now.

In this architecture, the web browser (via html/js client application) has the role of a media termination endpoint while of the role of the web server preferably is to pass on the media description that is required prior to the initiation of a media stream between two peers.

In overall a web application server is considered a communication domain that may interface with other communication domains including legacy telecommunication domains via standard or proprietary protocols.

In this environment the users of a web based real time communication platform can be reached from external or reach external parties depending on the configured networking and routing rules. The potential of reuse of resources such as a telephone number is greatly reduced and requires configuration of networking and routing rules.

LIST OF REFERNCE SYMBOLS USED IN THE DRAWINGS 001 transmission of user SIP credentials (e.g. SIP registrar address, E.164 number or SIP username, digest authentication password), user login
002 retrieve user SIP credentials
003 SIP request interface (Register message), SIP: register (user SIP credentials)
004 SIP: 200 OK
005 user registered in SIP
006 successful SIP registration
007 new peer connection media offer
008 retrieve user A SIP credentials
009 SIP: INVITE/SDP offer
010 SIP: 180/200 OK/SDP Answer
011 Check media compatibility
012 Signaling message: Media Answer
013 SIP: INVITE/SDP offer (from A to B)
014 SIP: INVITE/SDP offer (from A to B)
015 SIP: INVITE/SDP offer (from A to B)
016 Retrieve user B data
017 new peer connection media offer
018 Signaling Message: Media Answer
019 check media compatibility
020 SIP: 1810/200 OK/SDP Answer
021 SIP: 1810/200 OK/SDP Answer
022 SIP: Cancel
023 webRTC
024 SIP
025 ISDN
026 media stream
100 smart phone or tablet, WebRTC enabled client
200 WebRTC enabled web browser, web client interface, user browser WebRTC application, user browser B, WebRTC enabled client
300 SIP endpoint, SIP device B
400 WebRTC enabled communication application, web application server, web application server media management services, web media server
401 authentication service
402 data management
403 webRTC SIP mediation service
404 webRTC service
500 database (of user SIP credentials)
600 WebRTC destination
700 SIP server, SIP (SBC/Proxy/) registrar
800 SIP/PSTN GW
900 VoIP telephony user, SIP destination, SIP device A
1000 PSTN telephony user, traditional device

What is claimed is:

1. A method for creating a virtual Session Initiation Protocol (SIP) user agent by use of a Web Real Time Communicaiton (webRTC) enabled web browser, the method comprising:
   a) logging in to a web application server having a processor and non-transitory memory via a webRTC enabled web browser;
   b) the web application server using a logged in user identity from the logging in to the web application server to lookup an associated SIP user identity associated with a user of the logged in user identity along with a registrar server address;
   c) the web application server initiating a SIP registration procedure using an IP address of the web application server as a registered contact for said SIP user identity;
   the web application server maintaining user SIP credentials associated with said SIP user identity in a database and propagating the user SIP credentials to a registrar server via a SIP request interface so that a call received against said SIP user identity is reached and handled at the web application server in parallel to other existing contacts that are registered against the SIP user identity; and
      wherein the web application server is configured to communicate with the registrar server to initiate the SIP registration procedure to register the IP address of the web application server as the registered contact with the registrar server so that the communication connection that is sought with the user is established via the web application server in parallel with the seeking of the establishment of the call with any other existing authorized contacts for the user that are registered with the registrar server so that the call is established via the web application server.

2. The method according to claim 1, wherein the logging in to the web application server uses a username and password authentication.

3. The method according to claim 1, wherein, the logging in occurs via authentication with a single sign-on.

4. The method according to claim 1, wherein the associated SIP user identity or the registrar server address are supplied by data received from a user.

5. The method according to claim 1, wherein the associated SIP user identity or the registrar server address are retrieved by a user identity management system.

6. A method for creating a virtual Session Initiation Protocol (SIP) user agent by use of a Web Real Time Communicaiton (webRTC) enabled web browser, the method comprising:
   processing a user login for a user by a web application server having an address, said user login being received by the web application server via a webRTC enabled web browser, said user login including a user identity of the user for logging in to at least one service of the web application server, the web application server comprising a processor connected to non-transitory memory;
   looking up a SIP user identity and a registrar server address associated with the user using the user identity obtained from the processing of the user login through the web application server;
   initiating, through the web application server communicating to a SIP registrar, a SIP registration procedure for the user using the web application server's address as a registered contact after the looking up of the SIP user identity and the registrar address so that a communication connection that is sought with the user is established via the web application server in parallel with a seeking of an establishment of the sought communication connection with any other existing authorized contacts for the user that are registered with the SIP registrar;
   the web application server maintaining a database that contains credentials of the user that include the SIP user identity and the registrar address of the SIP registrar so that the credentials of the user are utilizable by the web application server for initiation of a communication session with at least one endpoint device associated with a different user;
   the web application server initiating a SIP communication session between the webRTC enabled web browser of the user and at least one endpoint device associated with a different user based on the credentials of the user stored in the database so the SIP communication session is seamlessly performed via the web browser of the user and the web application server, the SIP communication session being a video communication in which video and audio is transmitted in the SIP communication session; and
      wherein the initiating, occurs for establishing the communication connection via the web application server in parallel with the seeking of the establishment of the sought communication connection with any other existing authorized contacts for the user that are registered with the SIP registrar.

7. The method of claim 6, wherein the web application server assumes and maintains in the database a plurality of different user SIP credentials and propagates this information to the SIP registrar via an appropriate SIP request interface, the SIP registrar being an SIP proxy or an SIP session border controller (SBC).

8. The method of claim 6, wherein the database includes an E.164 number, an SIP user name, and a digest authentication password.

9. The method of claim 6, wherein the SIP request interface is a REGISTER message.

10. The method of claim 6, comprising:
    receiving an incoming call directed to the user by the web application server after the address of the web application server is a registered contact with the SIP registrar;
    extracting media description offers from the incoming call by the web application server in response to receiving the incoming call; and
    offering the incoming call at the web browser via the web application server.

11. The method of claim 10, wherein the web application server receives the incoming call in parallel with at least one other device that is registered as a contact with the SIP registrar for the user.

12. The method of claim 11, wherein the incoming call was initiated by a dialed telephone number for a telephone of the user, the at least one other device comprising the telephone.

13. The method of claim 12, comprising:
    selecting at least one device to which to route the incoming call based on a pre-selected user selected destination.

14. The method of claim 6,
    wherein the address of the web application server is an Internet Protocol (IP) address.

15. The method of claim 6, wherein the web application server initiating an SIP communication session between the webRTC enabled web browser of the user and at least one endpoint device associated with a different user based on the credentials of the user stored in the database so the SIP communication session is seamlessly performable via the web browser of the user and the web application server comprising:

initiating a call to an SIP device via the web application server responding to a request for the call received from the browser such that establishment of the call between the browser and the SIP device occurs seamlessly such that a user interface of the browser is a same user interface as a user interface utilized for webRTC calls.

16. The method of claim 15, comprising:

communicating information to the SIP device to establish the call such that information about the user is displayable by the SIP device prior to the SIP device answering the call.

17. The method of claim 6, wherein:

the web application server maintaining the database that contains credentials of the user that include the SIP user identity and the registrar address of the SIP registrar so that the credentials of the user are utilizable by the web application server for initiation of the communication session with at least one endpoint device associated with the different user such that the web application server uses the credentials of the user via the database for initiation of the communication session with at least one endpoint device associated with the different user.

18. A communication system, comprising:

a web application server, the web application server comprising a processor connected to non-transitory memory;

a first user communication device having a browser that is associated with a user and is connectable to the web application server, the first user communication device comprising a processor and non-transitory memory to run the browser;

a Session Initiation Protocol (SIP) registrar device that is connectable to the web application server;

the web application server configured to process a user login for the user received via the browser of the first user device, the user login including a user identity of the user for logging in to at least one service of the web application server;

the web application server configured to look up a SIP user identity and a registrar server address associated with the user using the user identity obtained from the processing of the user login;

the web application server configured to communicate with the SIP registrar device to initiate a SIP registration procedure to register an address of the web application server as a registered contact with the SIP registrar device so that a communication connection that is sought with the user is established via the web application server in parallel with a seeking of an establishment of the sought communication connection with any other existing authorized contacts for the user that are registered with the SIP registrar device;

the web application server configured to maintain a database that contains credentials of the user that include the SIP user identity and the registrar address of the SIP registrar device so that the credentials of the user are utilizable by the web application server for initiation of a communication session with at least one endpoint device associated with a different user;

the web application server configured to initiate a SIP communication session between the browser and at least one endpoint device associated with a different user based on the credentials of the user stored in the database so the SIP communication session is seamlessly performed via the web browser of the user and the web application server, the SIP communication session being a communication in which audio is transmitted in the SIP communication session.

19. The communication system of claim 18, comprising:

a second user communication device associated with the user that is connectable to the SIP registrar device, the second user communication device comprising a processor and non-transitory memory, wherein the second user communication device has an address that is registered with the SIP registrar device as a registered contact for the user; and wherein the SIP registrar device is configured to route an incoming call directed to the user to both the web application server and the second user communication device in parallel based on addresses of the web application server and second user communication device being registered contacts for the user after the address of the web application server is registered as a registered contact with the SIP registrar device;

wherein the SIP communication session is a communication in which video is also transmitted in the SIP communication session; and wherein the browser of the first user communication device is a webRTC browser.

20. The communication system of claim 18, wherein:

the first user communication device is connected to the web application server and the SIP registrar device is connected to the web application server;

the web application server is configured to maintain the database that contains credentials of the user that include the SIP user identity and the registrar address of the SIP registrar device so that the credentials of the user are utilizable by the web application server for initiation of a communication session with the at least one endpoint device associated with the different user such that the web application server uses the credentials of the user via the database.

\* \* \* \* \*